(12) United States Patent
Xia et al.

(10) Patent No.: US 11,307,477 B2
(45) Date of Patent: Apr. 19, 2022

(54) ANTI-PEEP SCREEN WITH DYNAMICALLY ADJUSTABLE OPTICAL SCREEN

(71) Applicant: INTERNATIONAL BUSINESS MACHINES CORPORATION, Armonk, NY (US)

(72) Inventors: Yin Xia, Beijing (CN); Ting Yin, Beijing (CN); Dong Chen, Beijing (CN); Ting Ting Bj Zhan, Beijing (CN); Xiang Juan Meng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/136,700

(22) Filed: Dec. 29, 2020

(65) Prior Publication Data
US 2021/0116774 A1    Apr. 22, 2021

Related U.S. Application Data

(63) Continuation of application No. 16/185,651, filed on Nov. 9, 2018, now Pat. No. 10,942,415.

(51) Int. Cl.
*G02F 1/17* (2019.01)
*G02F 1/01* (2006.01)

(52) U.S. Cl.
CPC ............ *G02F 1/172* (2013.01); *G02F 1/0121* (2013.01)

(58) Field of Classification Search
CPC ................. G02F 1/172; G02F 1/0121
See application file for complete search history.

(56) References Cited

U.S. PATENT DOCUMENTS

| 9,229,253 B2 | 1/2016 | Schwartz et al. |
| 2008/0043317 A1 | 2/2008 | Hsu et al. |
| 2018/0059499 A1* | 3/2018 | Klement ............ H01L 27/3232 |

FOREIGN PATENT DOCUMENTS

| CN | 103576405 A | 2/2014 |
| CN | 106773444 A | 5/2017 |
| WO | 2015/185083 A1 | 12/2015 |

OTHER PUBLICATIONS

Paul Drzaic, "Microcapsule ink presages true e-paper", EE Times. https://www.eetimes.com/document.asp?doc_id=1140838. Dec. 21, 1999. pp. 1-4.

Neil Hughes, "Apple exploring hybrid e-ink-LCD displays with independent regions", Appleinsider. https://appleinsider.com/articles/11/04/07/apple_exploring_hybrid_e_ink_lcd_displays_with_independent_regions.html. Apr. 7, 2011. pp. 1-10.

List of IBM Patents or Patent Applications Treated as Related dated Dec. 29, 2020, 2 pages.

* cited by examiner

*Primary Examiner* — Robert E. Tailman
(74) *Attorney, Agent, or Firm* — Tutunjian & Bitetto, P.C.; Kurt Goudy

(57) ABSTRACT

An anti-peep screen is provided. The anti-peep screen includes a casing, a plurality of microspheres within the casing, wherein each of the microspheres includes a colorless transparent fluid fill and a plurality of charged particles, and a base electrode within the casing adjacent to the plurality of microspheres.

20 Claims, 4 Drawing Sheets

ANTI-PEEP SCREEN WITH DYNAMICALLY ADJUSTABLE OPTICAL SCREEN

BACKGROUND

Technical Field

The present invention generally relates to anti-spy/anti-peep screens and privacy filters for device displays, and more particularly to adjustable anti-spy/anti-peep screens.

Description of the Related Art

Anti-spy/anti-peep screens and privacy filters are meant to obscure what is on a device display or computer monitor from unwanted viewing. The anti-spy/anti-peep screens and privacy filters provide a layer of material that can help prevent a monitor or device display from being viewed from angles outside a predetermined viewing angle, which are typically from the sides. Anti-spy/anti-peep screens and privacy filters are intended to appear transparent when a user is looking at them straight on, and opaque when viewed from other fixed angles. Anti-spy/anti-peep screens and privacy filters can be made of plastic or glass and may have micro louvers built into them that allow light to pass through straight on but not on the sides, and/or other coating layers that can determine the range of angles that a display or monitor can be viewed from. Privacy filters can be polarized sheets of plastic that are placed over the monitor or device display, as separate components.

SUMMARY

In accordance with an embodiment of the present invention, an anti-peep screen is provided. The anti-peep screen includes a casing, a plurality of microspheres within the casing, wherein each of the microspheres includes a colorless transparent fluid fill and a plurality of charged particles, and a base electrode within the casing adjacent to the plurality of microspheres.

In accordance with another embodiment of the present invention, a method of adjusting an anti-peep screen is provided. The method includes applying a first voltage to a base electrode and a second voltage to an upright electrode that creates an electric field, wherein a plurality of charged particles within a plurality of microspheres migrate under the force of the electric field to a position within the microspheres to form an opaque screen in each of the plurality of microspheres.

In accordance with yet another embodiment of the present invention, a device with an anti-peep screen is provided. The device includes a device display, an anti-peep screen on the device display, wherein the anti-peep screen includes a plurality of microspheres including a colorless transparent fluid fill and a plurality of charged particles, electronic components electrically coupled to the device display and to the anti-peep screen, and a power supply electrically coupled to the electronic components.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide an anti-peep screen to provide users with additional privacy when using a mobile device. The anti-peep screen can obscure viewing a device display at various predetermined angles that can be set by the device user.

Embodiments of the present invention provide an anti-peep screen having a two-dimensional array of microspheres containing charged particles that can be positioned to obscure an angle of viewing. The positioning of the charged particles within the microspheres can be adjusted using electric fields. The microspheres can form a monolayer that is interposed between the device display and viewers of the device, that can include a user.

Embodiments of the present invention provide an anti-peep screen that can be dynamically controlled to adjust the obscured, partially obscured, and viewable areas of the device display. The peep-proof areas and angles can be dynamically adjusted to archive a better customized and more flexible anti-peep effect.

Embodiments of the present invention provide a method of adjusting the viewing angle of an anti-peep screen by changing the electric field applied to microspheres containing charged particles, where the charged particles can migrate under the applied electric field. The positioning of the charged particles within the microspheres can be adjusted using electric fields, so as to be positioned to obscure an angle of viewing.

Embodiments of the present invention provide an anti-peep screen that can be incorporated into mobile devices or attached to preexisting devices.

Exemplary applications/uses to which the present invention can be applied include, but are not limited to: display screens (e.g., touch screens, monitors, flat screen displays, etc.) of electronic devices, including mobile devices.

It is to be understood that the present invention will be described in terms of a given illustrative architecture; however, other architectures, structures, substrate materials and process features and steps may be varied within the scope of the present invention.

Figure 1:
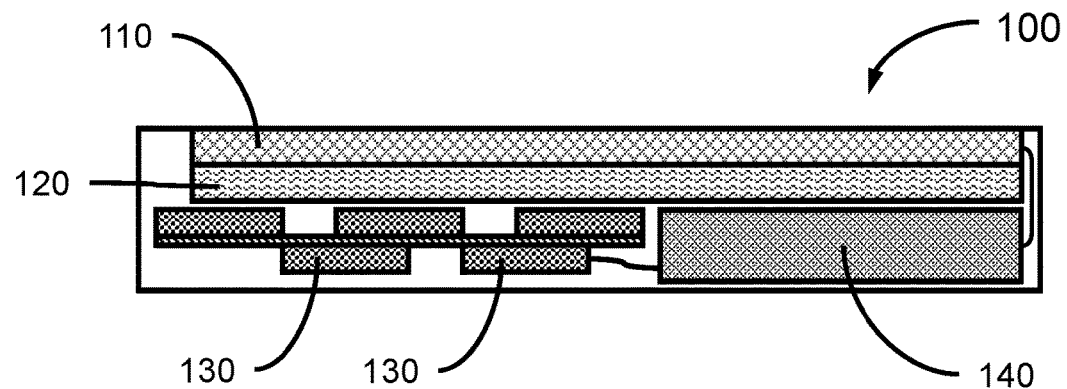
FIG. 1 is a cross-sectional side view showing a mobile device having an anti-peep screen, a display, control electronics, and a power supply, in accordance with an embodiment of the present invention.

Referring now to the drawings in which like numerals represent the same or similar elements and initially to FIG. 1, a cross-sectional side view of a mobile device having an anti-peep screen, a display, control electronics, and a power supply is shown, in accordance with an embodiment of the present invention.

In one or more embodiments, an anti-peep screen 110 can be on a device 100 having a display 120, where the anti-peep screen can be affixed to the device display 120 or incorporated into the device 100. The anti-peep screen 110 can be positioned between the device display 120 and a user of the device 100, such that the anti-peep screen 110 can interfere with the viewing of images shown on the device display 120. Stand-alone anti-peep screens 110 can be affixed to preexisting devices, for example, smart phones and computer monitors.

In one or more embodiments, the device 100 can be a mobile device, including, but not limited to, a cellular phone, smart phone, smart watch, personal digital assistant, personal information manager, handheld game console, tablet, laptop computer, mobile internet device, and portable media player, where the device can be carried by the user, for example, in a pocket, purse, handbag, briefcase, or backpack. The device 100 can include electronic components 130 for providing and controlling the device functions and a power supply 140, where the electronic components 130 and power supply 140 can be electrically coupled to the anti-peep screen 110 and the device display 120. In various embodiments, the power supply 140 can be a battery, where the battery can be a rechargeable battery. The device 100 can further include a user interface, including, but not limited to, touch-screen functionality of the device display 120, a touch pad, one or more input keys and/or a keyboard.

In various embodiments, the electronic components 130 can include, but not be limited to, digital logic circuits, for example, a central processing unit (CPU), a graphics processing unit (GPU), gates, counters, and an arithmetic processing unit (APU). The electronic components 130 can also include, but not be limited to, memory circuits, for example, volatile memory (e.g., dynamic random access memory (DRAM), static random access memory (SRAM)), and non-volatile memory (e.g., Flash memory, magnetic memory). The electronic components 130 can also include, but not be limited to, analog components and telecommunications components for cellular and/or wireless operation, including transmitter and receiver electronic circuits.

In various embodiments, the electronic components 130 and power supply 140 can be electrically coupled to the anti-peep screen 110 to provide predetermined functions to the anti-peep screen 110, including, but not limited to, setting and changing optical parameters of the anti-peep screen to obscure the device display for a range of viewing angles.

Figure 2:
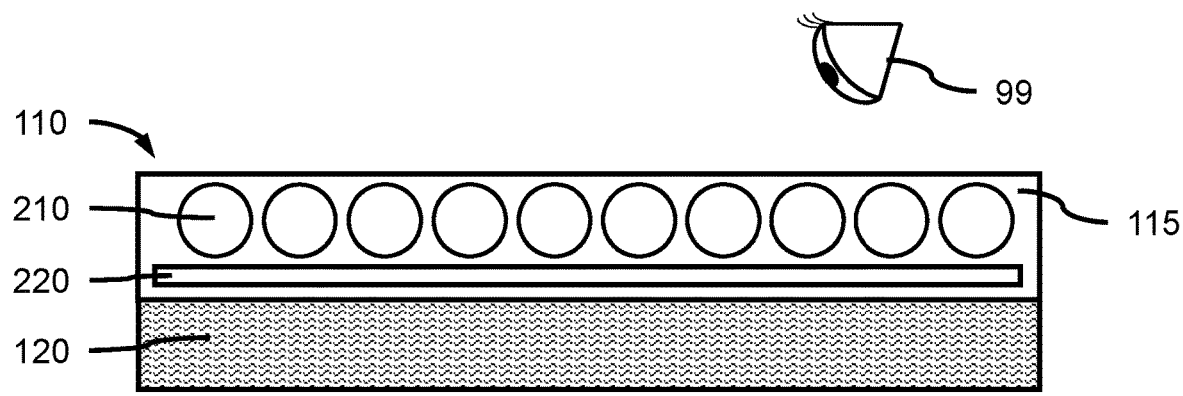
FIG. 2 is a cross-sectional side view showing a detailed view of an anti-peep screen with microspheres and a control electrode on a device display, in accordance with an embodiment of the present invention.

FIG. 2 is a cross-sectional side view showing a detailed view of an anti-peep screen with microspheres and a control electrode on a device display, in accordance with an embodiment of the present invention.

In one or more embodiments, the anti-peep screen 110 can be positioned over the device display 120, so a user and other observers look through the anti-peep screen 110 to see images present on the device display 120. The anti-peep screen 110 can include transparent features that allow light to be transmitted from the surroundings through the anti-peep screen 110 to the device display 120, and light from the device display 120 to be transmitted through the anti-peep screen 110 to the user and the surrounding environment.

In various embodiments, the anti-peep screen 110 can include a transparent casing 115 inside of which the components of the anti-peep screen 110 can be situated. In various embodiments, the transparent casing 115 can be plastic (e.g., polycarbonate, polymethlamethacrylate (PMMA), glycol modified polyethylene terephthalate (PETG)), glass, including, but not limited to, tempered or chemically strengthened borosilicate or soda-lime glass, or a transparent ceramic (e.g., aluminum oxide ($Al_2O_3$), sapphire, aluminum oxynitride (AlON), yttria alumina garnet (YAG), etc.) or a combination thereof.

In various embodiments, the transparent casing 115 can have a thickness in a range of about 10 microns (um) to about 500 um, or about 100 um to about 250 um, although other thicknesses are also contemplated. The thickness of the transparent casing 115 can depend on the diameter of the microspheres and the number of monolayers of microspheres in the anti-peep screen 110 above the device display 120.

In one or more embodiments, a plurality of microspheres 210 can be encased in the transparent casing 115, where the casing 115 can hold the microspheres 210 in place. In various embodiments, the casing 115 can hold the microspheres 210 in a flat two-dimensional array, where a single layer (i.e., monolayer) of the microspheres 210 can be interposed between the surface of the device display 120 and a user 99. In various embodiments, a multilayer of microspheres 210 can be encased in the transparent casing 115, and interposed between the surface of the device display 120 and a user 99.

In various embodiments, the anti-peep screen 110 can include an electrode 220, where the electrode 220 can be situated adjacent to the microspheres 210, where the electrode 220 can be between the microspheres 210 and a device display 120, or between the microspheres 210 and a user 99. The electrode 220 can be a transparent electrode made of a transparent conductive material, for example, of indium tin oxide (ITO) or doped zinc oxide (ZnO). In various embodiments, the electrode 220 can be multiple electrode segments that can be individually addressed through the electronic components 130, where a voltage can be applied to the electrode 220 or electrode segments. The electrode 220 can include electrode segments approximately perpendicular (i.e, +/−5°) to a base electrode approximately parallel (i.e, +/−5°) with the surface of the device display 120.

Figure 3:
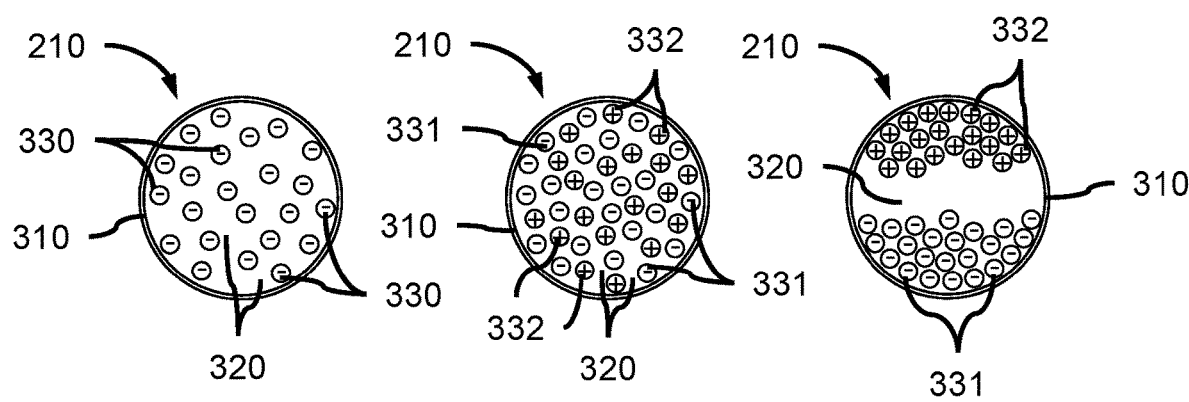
FIG. 3 is a cross-sectional side view showing detailed views of a microsphere, in accordance with different embodiments of the present invention.

FIG. 3 is a cross-sectional side view showing detailed views of a microsphere, in accordance with different embodiments of the present invention.

In various embodiments, the microspheres 210 can be hollow microspheres having an outside diameter in a range of about 5 micron (um) to about 300 um, or about 5 um to about 200 um, or about 10 um to about 100 um, although other outside diameters are also contemplated.

In various embodiments, the hollow microspheres 210 can have a wall 310 made of a transparent plastic, for example, a urea formaldehyde resin, or a glass.

In one or more embodiments, the hollow microspheres 210 can be filled with a colorless transparent fluid fill 320, where the colorless transparent fluid fill can be a liquid dispersion medium, for example, tetrachlorethylene. The colorless transparent fluid fill 320 can be uncharged, so the colorless transparent fluid fill 320 would not migrate under an applied electric field.

In one or more embodiments, particles 330 can be within the hollow microspheres 210, where the particles 330 can be suspended in the colorless transparent fluid fill 320. The particles 330 can be charged particles, where the particles 330 can have an inherent electrical change of a predetermined polarity (e.g., positive or negative). In various embodiments, the particles 330 can be colored particles, where the particles 330 can be black pigment particles, white pigment particles, or other colored particles. In various embodiments, the particles 330 can be organic dye molecules having a predetermined color and electrical charge.

In various embodiments, the particles 330 can have a diameter in a range of about 10 nanometers (nm) to about 500 nm, or about 10 nm to about 300 nm, or about 50 nm to about 500 nm, or about 50 nm to about 300 nm, although other diameters are also contemplated. The particles 330 can have diameter in a range of about one-thousandth ($\frac{1}{1000}$) to about one-fifth ($\frac{1}{5}$), or about one-one hundredth ($\frac{1}{100}$) to about one-tenth ($\frac{1}{10}$) the size of the diameter of the hollow microspheres 210. The particles 330 can have diameter small enough to move freely within the hollow microspheres 210.

In various embodiments, the particles 330 can fill up less than half of the volume of the hollow microspheres 210, or less than a third of the volume of the hollow microspheres 210, or less than a quarter of the volume of the hollow microspheres 210. In various embodiments, the particles 330 can fill up more than one-tenth ($\frac{1}{10}$) the volume of a hollow microsphere 210, where the loading of each hollow microsphere 210 can be sufficient to provide optical screening of an image on a device display 120, while allowing a user to view the screen from a predetermined range of viewing angles. In various embodiments, hollow microspheres 210 with a lower particle loading can be used with multiple monolayers of hollow microspheres 210 to achieve an intended screening of an image.

In one or more embodiments, both negatively charged particles 331 and positively charged particles 332 can be encapsulated within each microsphere, where negatively charged particles 331 can be of a first color (e.g., white pigment/dye) and the positively charged particles 332 can be of a second color (e.g., black pigment/dye). There may be an equal number of negatively charged particles 331 and positively charged particles 332 to maintain charge neutrality within the hollow microspheres 210. The negatively charged particles 331 and positively charged particles 332 can be interdispersed within the hollow microsphere 210, where charge repulsion by the same charged particles and charge attraction and shielding by oppositely charged particles, along with Brownian motion of the particles with in the colorless transparent fluid fill 320 can avoid agglomeration (i.e., clumping) of particles having the same color within the hollow microspheres 210. The interspersion of the differently colored particles 330 within the colorless transparent fluid fill 320 can reduce the opacity of the microspheres 210.

In various embodiments, microspheres encapsulating particles 330 can have a sufficient transparency to allow viewing of the device display 120 by a user 99 at the predetermined angle(s) not blocked by the particles 330. The microspheres 210 can encapsulate particles 330 of one color or particles of different colors (e.g., black or white). The particles 330 can have a single electrical change or particles of different colors can have opposite electrical charges.

In various embodiments, the negatively charged particles 331 and positively charged particles 332 can react to an applied electric field, such that the negatively charged particles 331 can move towards a positively charged electrode 220 or electrode segment, and the positively charged particles 332 can move towards a negatively charged electrode 220 or electrode segment, so the oppositely charged particles become separated under the applied electric field.

Figure 4:
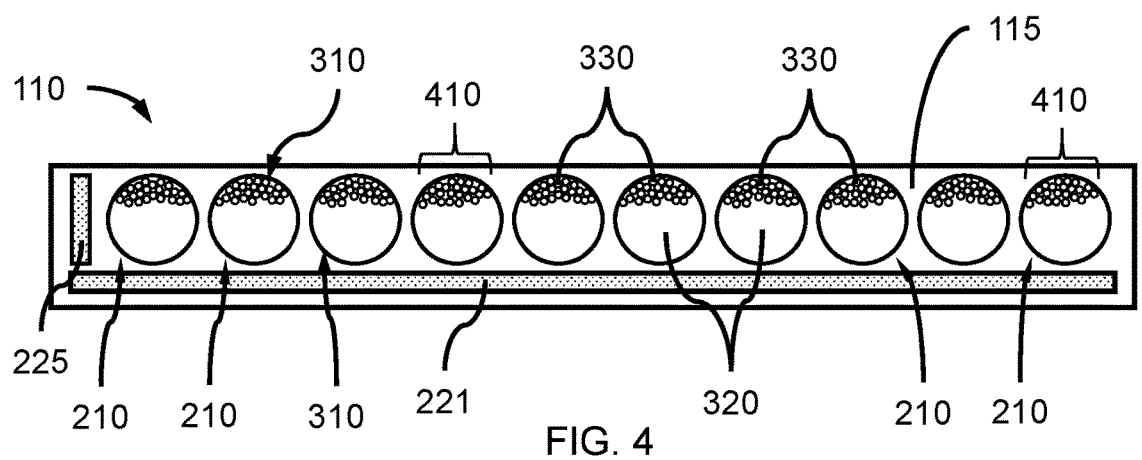
FIG. 4 is a cross-sectional side view showing a detailed view of an anti-peep screen with a plurality of microspheres and multiple control electrodes, in accordance with an embodiment of the present invention.

FIG. 4 is a cross-sectional side view showing a detailed view of an anti-peep screen with a plurality of microspheres and multiple control electrodes, in accordance with an embodiment of the present invention.

In one or more embodiments, the anti-peep screen 110 can include a base electrode 221 and an upright electrode 225 that can be perpendicular or oblique to the base electrode 221. The microspheres 210 can form a monolayer within the casing 115. Each of the microspheres 210 can include particles 330 suspended in the transparent fluid fill 320, where the particles 330 can have a single color and an electrical charge (i.e., positive or negative).

In one or more embodiments, an electrical charge of an intended polarity (i.e., positive or negative) can be applied to the base electrode 221 and the one or more upright electrode(s) 225 to create an electrical field that can cause the charged particles 330 to migrate in a particular direction and accumulate in a particular portion of the microsphere 210. The electrical field can be created to cause the charged particles 330 in each of the microspheres 210 to migrate in the same direction and accumulate in the same portion of each microsphere 210, so the mass of charged particles 330 forms an opaque screen 410 along a portion of the arc of the inside radius of the microsphere 210. The opaque screen 410 in each microsphere can form an angle with the surface of the device display 120, such that the array of opaque screens 410 forms a grating (e.g., a series of louvers) blocking a view of the device display 120 from an angle normal to the angle of the opaque screens 410 and extending an angle to either side of the normal depending on the particle loading and inside radius of the microspheres. Unlike privacy screens that obscures only a fix viewing angle, the opaque screen 410 in each microsphere can be adjusted by a user to obscure particular viewing angles by changing the electric field applied to the charged particles 330.

In various embodiments, a voltage, V, can be applied to the base electrode 221 and the same or a different voltage (i.e., magnitude, polarity) can be applied to the upright electrode 225 to create an electrical field to cause the charged particles 330 to migrate, where the range of applied voltage can depend on the charge on the particles, particle sizes, and properties of the transparent fluid fill 320 and wall 310 of the hollow microspheres 210 (e.g., dielectric constant of the materials).

Figure 5:
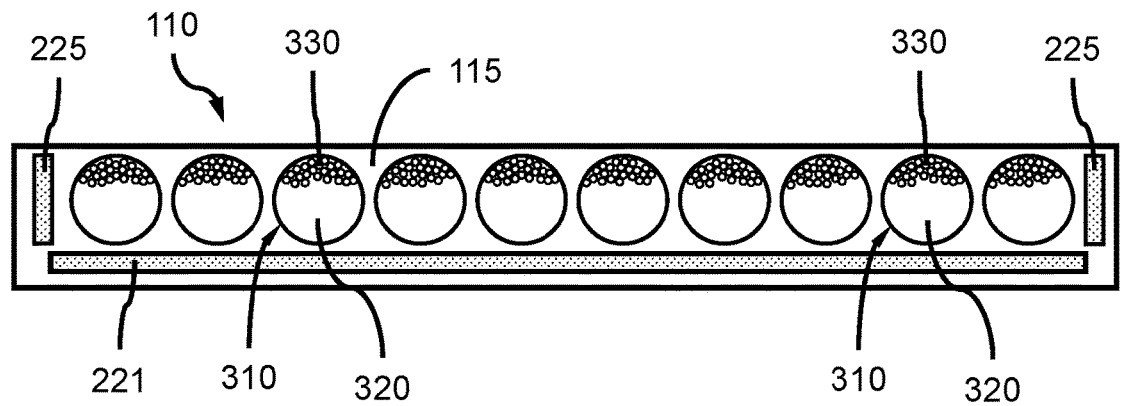
FIG. 5 is a cross-sectional side view showing a detailed view of an anti-peep screen with a plurality of microspheres and multiple control electrodes, in accordance with another embodiment of the present invention.

FIG. 5 is a cross-sectional side view showing a detailed view of an anti-peep screen with a plurality of microspheres and multiple control electrodes, in accordance with another embodiment of the present invention.

In one or more embodiments, the anti-peep screen 110 can include a base electrode 221 and two or more upright electrodes 225 that can be perpendicular or oblique to the base electrode 221. In various embodiments, the upright electrodes 225 can be at opposite sides of the array of microspheres 210 and the base electrode 221 can be on a backside or front side of the array of microspheres. A positive voltage can be applied to one of the upright electrodes 225 and a negative voltage can be applied to the other upright electrode 225 to establish a controlled and uniform electric field transverse to the portion of the field created by the base electrode 221 to provide better control over the migration and positioning of the particles 330 for better control and uniformity over the angle of the opaque screen 410 formed in each microsphere 210.

In various embodiments, an upright electrode 225 can be positioned at opposite ends of each row of microspheres 210 forming the monolayer array. A separate voltage can be applied to each of the upright electrodes 225 to fine tune the electric field over the monolayer array of microspheres 210. In various embodiments, the upright electrode 225 can be a plurality of upright electrode segments, where each segment can have a different voltage (i.e., polarity, magnitude) applied to increase control of the electric field.

Figure 6:
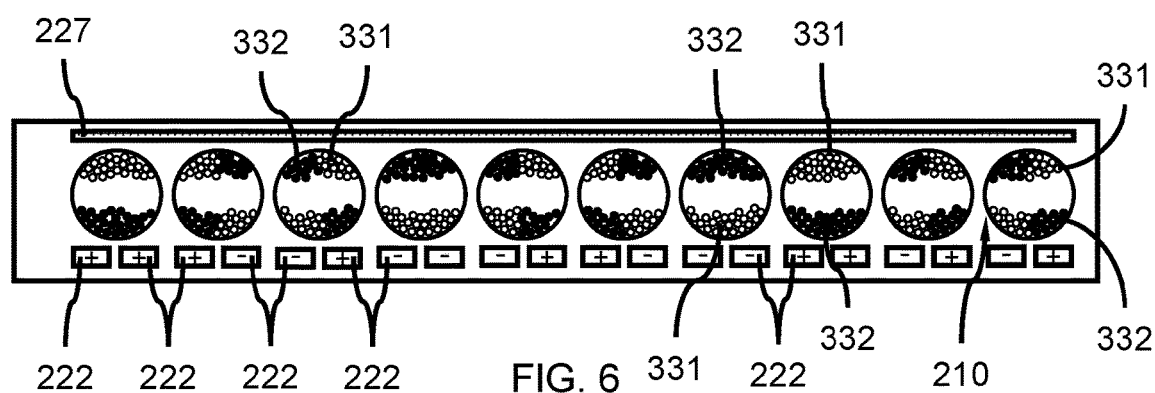
FIG. 6 is a cross-sectional side view showing a detailed view of an anti-peep screen with a plurality of microspheres having different particles and a plurality of addressable control electrode segments, in accordance with another embodiment of the present invention.

FIG. 6 is a cross-sectional side view showing a detailed view of an anti-peep screen with a plurality of microspheres having different particles and a plurality of addressable control electrode segments, in accordance with another embodiment of the present invention.

In one or more embodiments, the base electrode 221 can be divided into base electrode segments 222, where two or more base electrode segments 222 can be directly adjacent to the same microsphere 210. In various embodiments, a transparent reference electrode 227 can be on the opposite side of the microsphere array from the base electrode segments 222 to maintain a more uniform electric field across the microspheres 210.

In one or more embodiments, the charged particles 330 can include both negatively charged particles 331 and positively charged particles 332, where the negatively charged particles 331 can be a first color and the positively charged particles 332 can be a second color different from the first color. The differently charged particles 331, 332 can migrate to different regions of the microspheres under the applied electric field to provide different optical opacity to the different microspheres 210.

In a non-limiting exemplary embodiment, two base electrode segments 222 can be directly adjacent to the same microsphere 210, and each microsphere can include negatively charged particles 331 and positively charged particles 332, where the negatively charged particles 331 are a first color (e.g., black) and the positively charged particles 332 are a second color (e.g., gold). The application of voltages to each of the two base electrode segments 222 can cause the oppositely charged particles 331, 332 to partition into different agglomerations against the microsphere wall 310. A voltage applied to the reference electrode 227 can control the way the charged particles 331, 332 partition, where particles charged opposite from the base electrode segments 222 and/or reference electrode 227 will migrate towards the closet electrode, and particles charged the same as the base electrode segments 222 and/or reference electrode 227 will migrate away from the closest electrode until equilibrium positions are established that minimize the energy of the charged particles 331, 332 within each microsphere 210.

Figure 7:
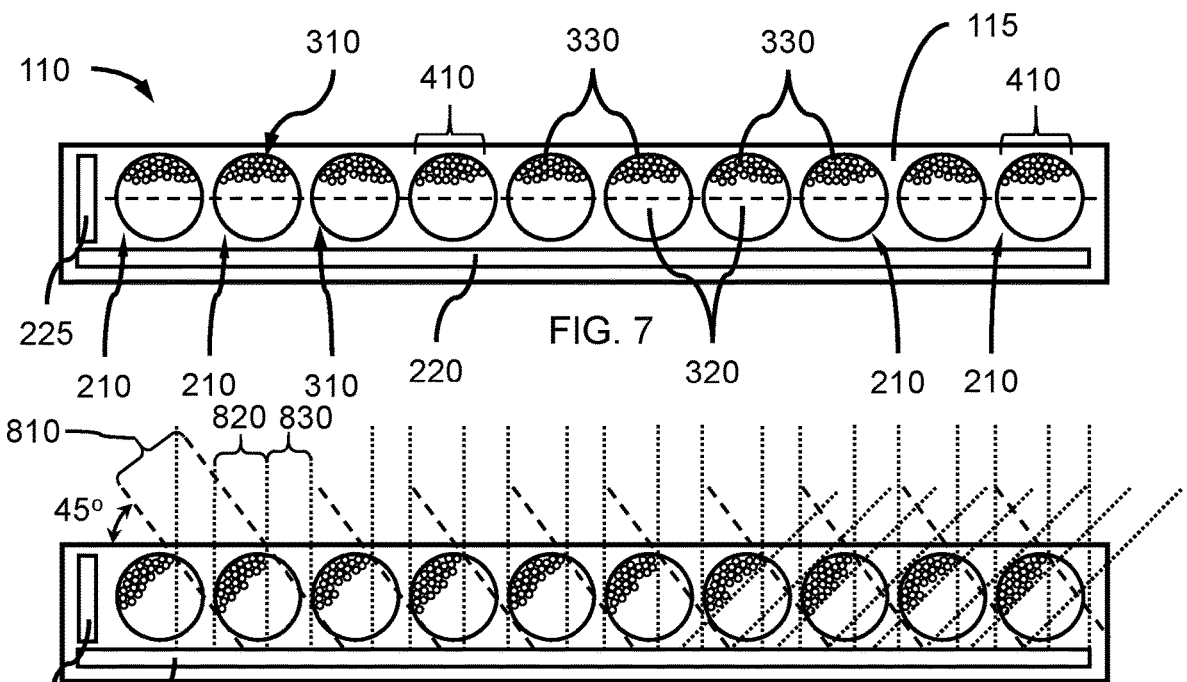
FIG. 7 is a cross-sectional side view showing a detailed view of an anti-peep screen with a plurality of microspheres having charged particles positioned by control electrodes, in accordance with another embodiment of the present invention.

FIG. 7 is a cross-sectional side view showing a detailed view of an anti-peep screen with a plurality of microspheres having charged particles positioned by control electrodes, in accordance with another embodiment of the present invention.

In various embodiments, the charged particles 330 in each of the microspheres 210 can migrate to a portion of microspheres 210 directly opposite the base electrode 221 to block the view of the entire device display 120, as a privacy feature.

The charge on each electrode can be configured to repel charged particles 330 with the same electric charge, where the particles 330 can be opaque to block the view along a predetermined angle with the device display. Charged particles 330 with the opposite electric charge as the electrode can be attracted to the electrode(s).

Figure 8:
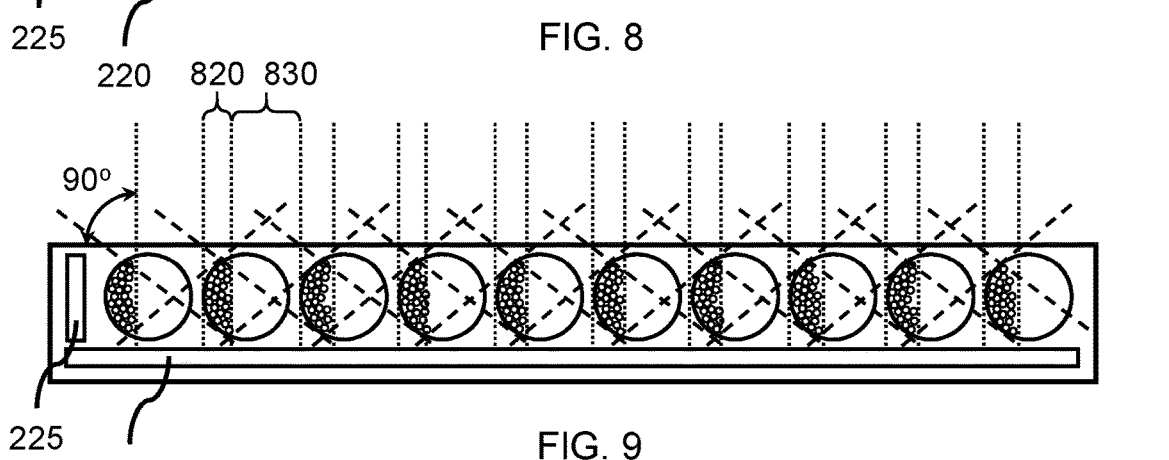
FIG. 8 is a cross-sectional side view showing a detailed view of an anti-peep screen with a plurality of microspheres having charged particles arranged to obscure a predetermined viewing angle, in accordance with another embodiment of the present invention.

FIG. 8 is a cross-sectional side view showing a detailed view of an anti-peep screen with a plurality of microspheres having charged particles arranged to obscure a predetermined viewing angle, in accordance with another embodiment of the present invention.

In various embodiments, the charged particles 330 in each of the microspheres 210 can migrate to a region in the microspheres 210 to form an opaque screen 410 at a predetermined oblique angle with the surface of the device display, so unwanted viewers looking at the device within a range of angles from the normal of the opaque screen 410 cannot see the device display. In various embodiments, the oblique angle of the opaque screen 410 can be in a range of 1° to 89°, or about 30° to about 75°, or about 45° to about 60°. The angle of the opaque screens 410 can fully obscure 810 the device display for viewers with a line of vision perpendicular to the angle of the opaque screens, and partially obscure 820 the device display for viewers with a line of vision at other angles to either side of the normal.

The width of the opaque screen 410 within each of the microspheres 210 can result in the opaque screens 410 overlapping between a range of angles of view, while angles of view outside the range may be only partially obscured. The extent that a view is obscured can decrease as the viewing angle becomes parallel with the angle of the opaque screens 410, where the thickness of the opaque screens 410 can still partially obscure a parallel angle of view between the microspheres. The width of the unobscured field of view 830 perpendicular to the surface of the device display can vary with the angle of the opaque screens 410.

Figure 9:
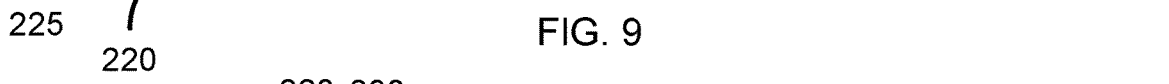
FIG. 9 is a cross-sectional side view showing a detailed view of an anti-peep screen with a plurality of microspheres having charged particles arranged to obscure another predetermined viewing angle, in accordance with another embodiment of the present invention.

FIG. 9 is a cross-sectional side view showing a detailed view of an anti-peep screen with a plurality of microspheres having charged particles arranged to obscure another predetermined viewing angle, in accordance with another embodiment of the present invention.

In various embodiments, the charged particles 330 in each of the microspheres 210 can migrate to a position where the opaque screens 410 are effectively perpendicular (i.e., about 90°) to the surface of the device display to provide the widest unobstructed view 830 with the least obstruction of the display to a viewer looking perpendicular to the device display, but also providing the widest range of viewing angles before the display is obscured by overlapping opaque screens 410.

Figure 10:
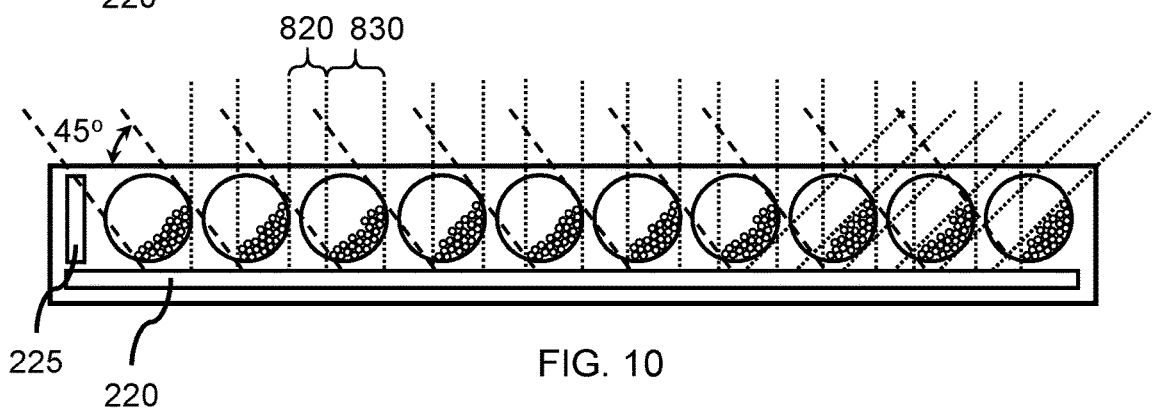
FIG. 10 is a cross-sectional side view showing a detailed view of an anti-peep screen with a plurality of microspheres having charged particles arranged to obscure another predetermined viewing angle, in accordance with another embodiment of the present invention.

FIG. 10 is a cross-sectional side view showing a detailed view of an anti-peep screen with a plurality of microspheres having charged particles arranged to obscure another predetermined viewing angle, in accordance with another embodiment of the present invention.

In one or more embodiments, a reversal of the charge on the base electrode 221 and one or more upright electrodes 225 that attract the charged particles 330 can cause the charged particles to invert and form the opaque screen 410 closer to the surface of the device display 120, where the change in distance of the opaque screen 410 from the surface of the device display can alter the range of angles at which the display is partially obscured, while having a similar unobstructed view 830 as the reversed polarity but same angle of the opaque screens 410.

Figure 11:
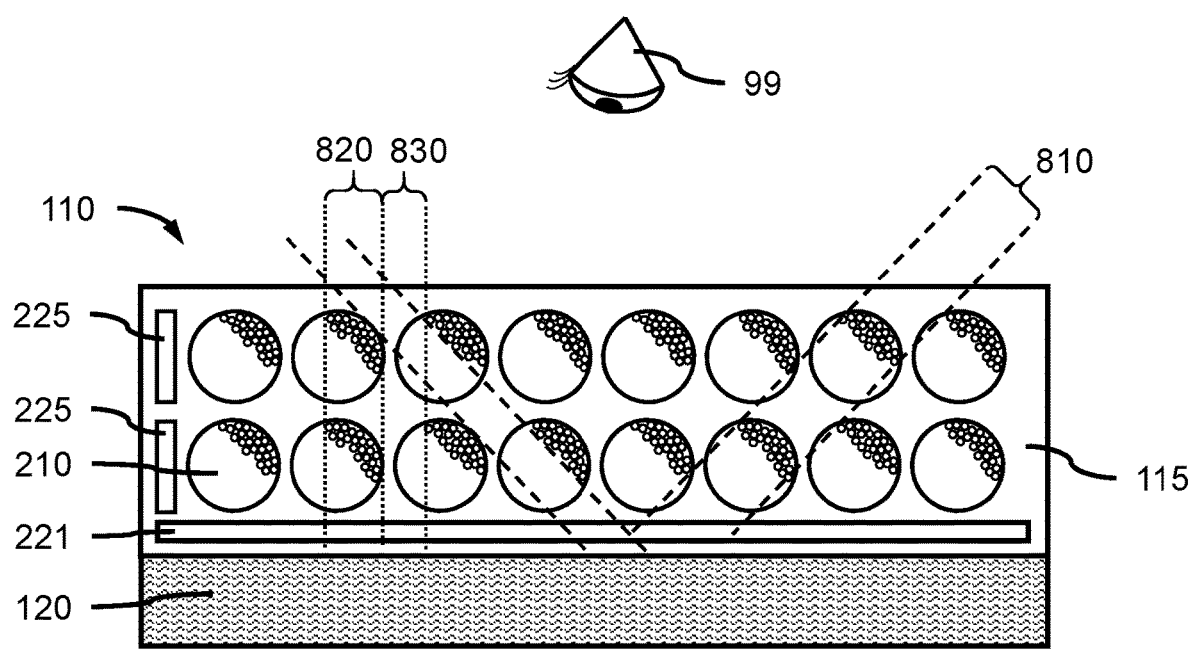
FIG. 11 is a cross-sectional side view showing a detailed view of an anti-peep screen with multiple layers of stacked microspheres having charged particles arranged to obscure another predetermined viewing angle, in accordance with another embodiment of the present invention.

FIG. 11 is a cross-sectional side view showing a detailed view of an anti-peep screen with multiple layers of stacked microspheres having charged particles arranged to obscure another predetermined viewing angle, in accordance with another embodiment of the present invention.

In various embodiments, multiple layers of the 2-dimensional arrays of microspheres 210 can be stacked to increase the blocking of observes' view at other than the predetermined angle set by the user. The range of angles with an unobscured field of view can be decreased by the addition of each layer of microspheres 210, and the range of angles at which the view is at least partially obscured or fully obscured can be increased due to the overlapping of opaque screens 410 on different monolayers. The monolayers of microspheres can be stacked to form aligned columns of microspheres normal to the surface of the device display 210 and top surface of a casing 115.

In various embodiments, upright electrodes 225 that can be perpendicular or oblique to the base electrode 221 can be on opposite ends of each monolayer of microspheres 210.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, may be used herein for ease of description to describe one element's or feature's relationship to another element(s) or feature(s) as illustrated in the FIGS. It will be understood that the spatially relative teams are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present concept.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Having described preferred embodiments of a device and method of operating the device (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An anti-peep screen, comprising:
   a casing;
   two or more stacked monolayers of microspheres within the casing, wherein each of the microspheres includes a colorless transparent fluid fill and a plurality of charged colored particles; and
   a base electrode within the casing adjacent to the plurality of microspheres, wherein the base electrode is configured to cause the plurality of charged colored particles to migrate to a region in the microspheres such that a range of angles at which a view through the stacked monolayers is at least partially obscured is increased due to an overlapping of opaque screens on different monolayers.

2. The anti-peep screen of claim 1, wherein the microspheres have an outside diameter in a range of about 5 micron (um) to about 300 um.

3. The anti-peep screen of claim 1, wherein an oblique angle of the opaque screen is about 30° to about 75°.

4. The anti-peep screen of claim 1, wherein the casing has a thickness in a range of about 10 microns (um) to about 500 um, and is configured to attach to a display.

5. The anti-peep screen of claim 1, further comprising an upright electrode perpendicular or oblique to the base electrode.

6. The anti-peep screen of claim 1, further comprising two upright electrodes perpendicular or oblique to the base electrode, wherein the upright electrodes are on opposite ends of the plurality of microspheres, and wherein the base electrode is a transparent electrode made of a transparent conductive material selected from the group consisting of indium tin oxide (ITO) and doped zinc oxide (ZnO).

7. The anti-peep screen of claim 1, wherein the two or more stacked monolayers of microspheres is two stacked monolayers of microspheres.

8. The anti-peep screen of claim 1, wherein the base electrode includes a plurality of electrode segments.

9. The anti-peep screen of claim 1, further comprising electronic components, wherein the base electrode segments are individually addressable by the electronic components.

10. A method of controlling a viewing angle of an anti-peep screen, comprising:
applying a first voltage to a base electrode and a second voltage to an upright electrode that creates an electric field across two or more stacked monolayers of microspheres, wherein a plurality of charged particles within the microspheres migrate under the force of the electric field to a position within the microspheres to form an opaque screen that interferes with the viewing of an image on an opposite side of the anti-peep screen from a viewer.

11. The method of claim 10, wherein the first voltage is the opposite polarity as the electric charge on the plurality of charged particles.

12. The method of claim 10, further comprising adjusting the second voltage to one or more upright electrodes to change the viewing angle, wherein an oblique angle of the opaque screen is about 30° to about 75°.

13. The method of claim 12, wherein the second voltage is opposite the polarity of the first voltage.

14. The method of claim 13, wherein the base electrode is a transparent electrode made of a transparent conductive material selected from the group consisting of indium tin oxide (ITO) and doped zinc oxide (ZnO).

15. A device with an anti-peep screen, comprising:
a device display;
the anti-peep screen on the device display, wherein the anti-peep screen includes two or more stacked monolayers of microspheres, the microspheres including a colorless transparent fluid fill and a plurality of charged colored particles;
electronic components electrically coupled to the device display and to the anti-peep screen; and
a power supply electrically coupled to the electronic components, wherein the anti-peep screen, electronic components, and power supply are electrically coupled and configured to cause the plurality of charged particles to migrate to a region in the microspheres to interfere with the viewing of an image on the display device through the anti-peep screen outside a predetermined viewing angle.

16. The device of claim 15, wherein the anti-peep screen is incorporated into the device.

17. The device of claim 15, wherein the anti-peep screen is affixed to the device display.

18. The device of claim 15, wherein the power supply is a rechargeable battery.

19. The device of claim 15, wherein the two or more stacked monolayers of microspheres, and a base electrode are within a casing.

20. The device of claim 19, wherein the base electrode is a transparent electrode made of a transparent conductive material selected from the group consisting of indium tin oxide (ITO) and doped zinc oxide (ZnO).

* * * * *